United States Patent
Lee et al.

(10) Patent No.: US 9,798,461 B2
(45) Date of Patent: Oct. 24, 2017

(54) ELECTRONIC SYSTEM WITH THREE DIMENSIONAL USER INTERFACE AND METHOD OF OPERATION THEREOF

(71) Applicant: Samsung Electronics Co., Ltd., Gyeonggi-Do (KR)

(72) Inventors: Seungeun Lee, Sunnyvale, CA (US); Sara Kwan, Sunnyvale, CA (US); Justin Gregg, Golden, CO (US); Michael Rosenblatt, Boulder, CO (US); Guy Bar-Nahum, San Francisco, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 234 days.

(21) Appl. No.: 13/833,077

(22) Filed: Mar. 15, 2013

(65) Prior Publication Data
US 2014/0267233 A1    Sep. 18, 2014

(51) Int. Cl.
*G06F 3/0488*    (2013.01)
*G06F 3/0484*    (2013.01)
*G06F 3/0481*    (2013.01)
*G06F 1/16*    (2006.01)

(52) U.S. Cl.
CPC ........ *G06F 3/04883* (2013.01); *G06F 1/1639* (2013.01); *G06F 1/1694* (2013.01); *G06F 3/04815* (2013.01); *G06F 2200/1636* (2013.01)

(58) Field of Classification Search
CPC ...... G06T 19/20; G06T 19/00; G06F 3/04883
USPC .......................................................... 345/419
See application file for complete search history.

(56) References Cited

U.S. PATENT DOCUMENTS

| | | | |
|---|---|---|---|
| 7,439,975 B2 | 10/2008 | Hsu | |
| 2006/0061551 A1* | 3/2006 | Fateh | 345/158 |
| 2006/0188234 A1* | 8/2006 | Takeshita | 386/107 |
| 2007/0003134 A1 | 1/2007 | Song et al. | |
| 2011/0098911 A1* | 4/2011 | Ellanti | G01C 21/3602 701/532 |
| 2011/0103651 A1* | 5/2011 | Nowak | G01C 21/3647 382/106 |
| 2011/0115788 A1* | 5/2011 | Lee | 345/419 |
| 2011/0115880 A1* | 5/2011 | Yoo et al. | 348/42 |
| 2011/0164029 A1 | 7/2011 | King et al. | |
| 2011/0246877 A1* | 10/2011 | Kwak et al. | 715/702 |

(Continued)

FOREIGN PATENT DOCUMENTS

EP    2428882 A2    3/2012

OTHER PUBLICATIONS

Wong, Phillip, "Pioneer demonstrates cool Floating Vision displays", May 28, 2011, Publisher: CNET News, http://news.cnet.com/8301-17938_105-20066957-1/pioneer-demonstrates-cool-floating-vision-displays/?tag=cnetRiver.

*Primary Examiner* — James A Thompson
*Assistant Examiner* — Hai Tao Sun
(74) *Attorney, Agent, or Firm* — IP Investment Law Group

(57) ABSTRACT

An electronic system includes: a raise objects module configured to raise a first object along a Z-axis displaying the first object above a display; a height determination module, coupled to the raise objects module, configured to generate a first adjustment value based on a height determining factor including frequency; and an adjustment module, coupled to the height determination module, configured to adjust the first object along the Z-axis based on the first adjustment value.

19 Claims, 8 Drawing Sheets

(56) References Cited

U.S. PATENT DOCUMENTS

| | | | |
|---|---|---|---|
| 2011/0304699 A1* | 12/2011 | Ito | A63F 13/10 |
| | | | 348/47 |
| 2012/0007850 A1* | 1/2012 | Piemonte | 345/419 |
| 2012/0036433 A1 | 2/2012 | Zimmer et al. | |
| 2012/0062549 A1* | 3/2012 | Woo et al. | 345/419 |
| 2012/0113018 A1 | 5/2012 | Yan | |
| 2012/0139907 A1 | 6/2012 | Lee et al. | |
| 2012/0268410 A1 | 10/2012 | King et al. | |
| 2013/0085866 A1 | 4/2013 | Levitis et al. | |

* cited by examiner

ELECTRONIC SYSTEM WITH THREE DIMENSIONAL USER INTERFACE AND METHOD OF OPERATION THEREOF

TECHNICAL FIELD

The embodiment of the present invention relates generally to an electronic system, and more particularly to a system with a three dimensional user interface.

BACKGROUND

Modern portable consumer and industrial electronics, especially client devices such as electronic systems, cellular phones, portable digital assistants, and combination devices, are providing increasing levels of display functionality to support modern life. Research and development in the existing technologies can take a myriad of different directions.

There are many technological solutions to take advantage of new display technology. Electronic systems have been incorporated in automobiles, notebooks, handheld devices, and other portable products. Today, these systems struggle to display relevant usable information, customer service, or products in an increasingly competitive and crowded market place.

Thus, a need still remains for an electronic system able to display important, germane, and useful information to users. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides an electronic system, including: a raise objects module configured to raise a first object along a Z-axis displaying the first object above a display; a height determination module, coupled to the raise objects module, configured to generate a first adjustment value based on a height determining factor including frequency; and an adjustment module, coupled to the height determination module, configured to adjust the first object along the Z-axis based on the first adjustment value.

An embodiment of the present invention provides a method of operation of an electronic system including: raising an object, with a control unit, along a Z-axis for displaying the object above a display; generating an adjustment value based on a height determining factor including frequency; and adjusting the object along the Z-axis based on the adjustment value.

An embodiment of the present invention provides a method of operation of an electronic system including: raising a first object and a second object, with a control unit, to an activation height for displaying the first object and the second object above a display; generating a first adjustment value and a second adjustment value based on a height determining factor including frequency; and adjusting a first height of the first object and a second height the second object along the Z-axis imparting relative heights to the first object and the second object, and the relative heights based on the first adjustment value and the second adjustment value.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
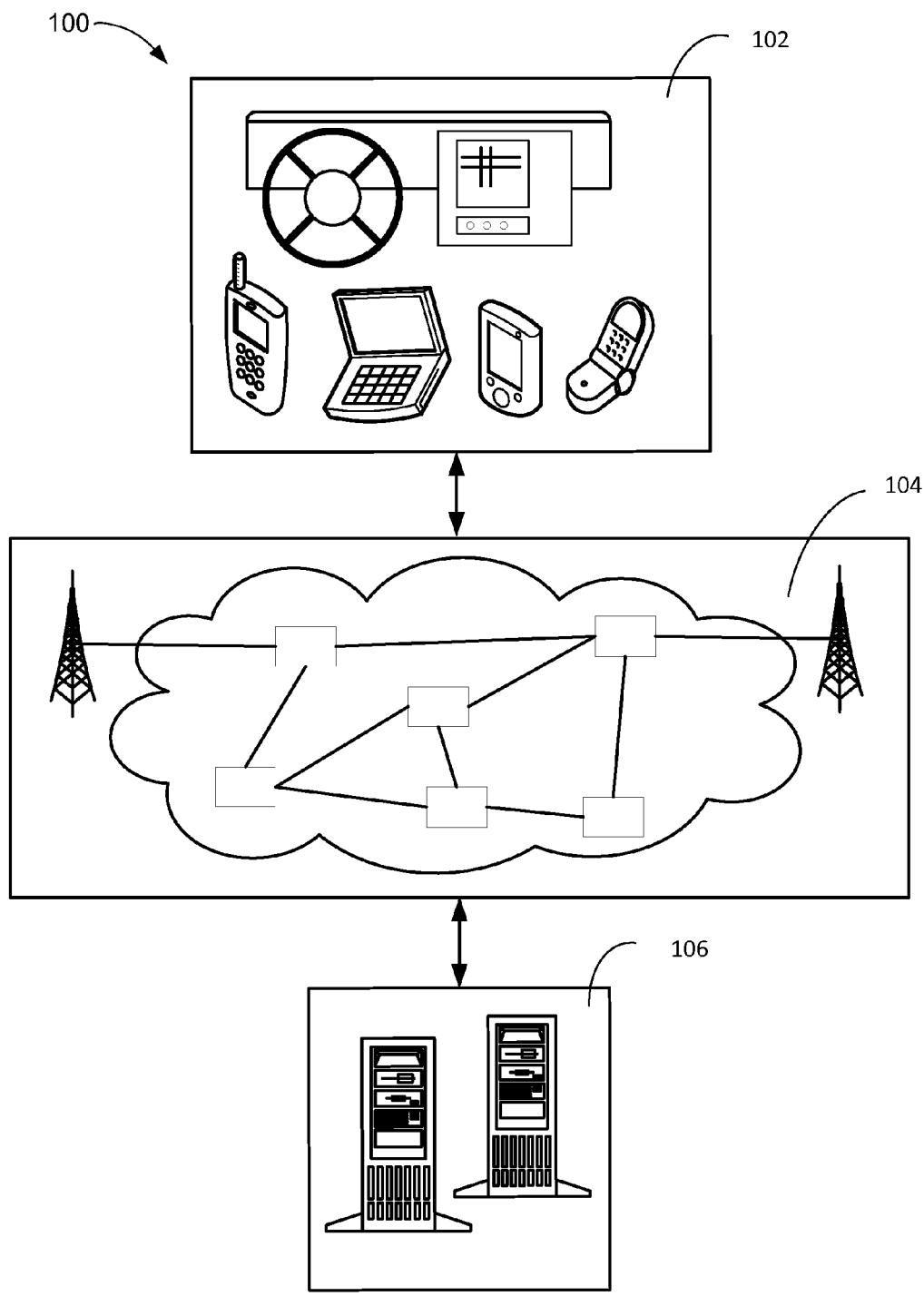
FIG. 1 is a functional block diagram of an electronic system in an embodiment of the present invention.

An embodiment of the present invention provide a three-dimensional floating user interface having visual height and depth. Objects from the display of the user interface appear to be floating above the display. The height and depth of the user interface can provide indications for importance, frequency of use, or relevance to a context, as examples. The user interface can also be reactive to the user's perception. For example, as a user's viewing distance to the display changes, the level of the three-dimensional user interfaces increases or flattens in regards to the visual height and depth.

The embodiment of the present invention provides the user interface that can be invoked based on factory settings, context, user preference settings, location, proximity, or voice. The user interface can be invoked by a back-side tap with a sufficient force to overcome a gravity effect of the floating objects over the display. The user interface can provide urgent notification with the height of the notification higher than the other floating objects or the lower object blurred to obscurity to make the notification object stand out more.

The following embodiments are described in sufficient detail to enable those skilled in the art to make and use the invention. It is to be understood that other embodiments would be evident based on the present disclosure, and that system, process, or mechanical changes may be made without departing from the scope of the embodiment of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for the embodiment of the present invention.

The term "module" referred to herein can include software, hardware, or a combination thereof of the embodiment of the present invention in accordance with the context in which the term is used. For example, the software can be machine code, firmware, embedded code, and application software. Also for example, the hardware can be circuitry, processor, computer, integrated circuit, integrated circuit cores, a sensor, a micro-electro-mechanical system (MEMS), passive devices, or a combination thereof.

Referring now to FIG. 1, therein is shown a functional block diagram of an electronic system 100 in an embodiment of the present invention. The electronic system 100 includes a first device 102, such as a client or a server, connected to a second device 106, such as a client or server, with a communication path 104, such as a wireless or wired network.

For example, the first device 102 can be of any of a variety of devices and can include global positioning satellite capability, such as a cellular phone, wearable devices, personal digital assistant, a notebook computer, automotive telematic navigation and infotainment system, other multi-functional mobile communication or entertainment device or even stationary devices including appliances with digital displays, televisions, or desktop computer monitors. The first device 102 can be a standalone device, or can be incorporated with a vehicle, for example a car, a truck, a bus, an aircraft, a boat, or a train. The first device 102 can couple to the communication path 104 to communicate with the second device 106. Coupling is defined as a physical connection.

For illustrative purposes, the electronic system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone.

For illustrative purposes, the electronic system 100 is described with the second device 106 as a non-mobile computing device, although it is understood that the second device 106 can be different types of computing devices. For example, the second device 106 can also be a mobile computing device, such as notebook computer, wearable devices, another client device, or a different type of client device. The second device 106 can be a standalone device, or can be incorporated with a vehicle, for example a car, a truck, a bus, an aircraft, a boat, or a train.

Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), Near field communication (NFC), and worldwide interoperability for microwave access (WiMAX) are examples of wireless communication that can be included in the communication path 104. Ethernet, digital subscriber line (DSL), fiber to the home (FTTH), High-Definition Multimedia Interface (HDMI), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
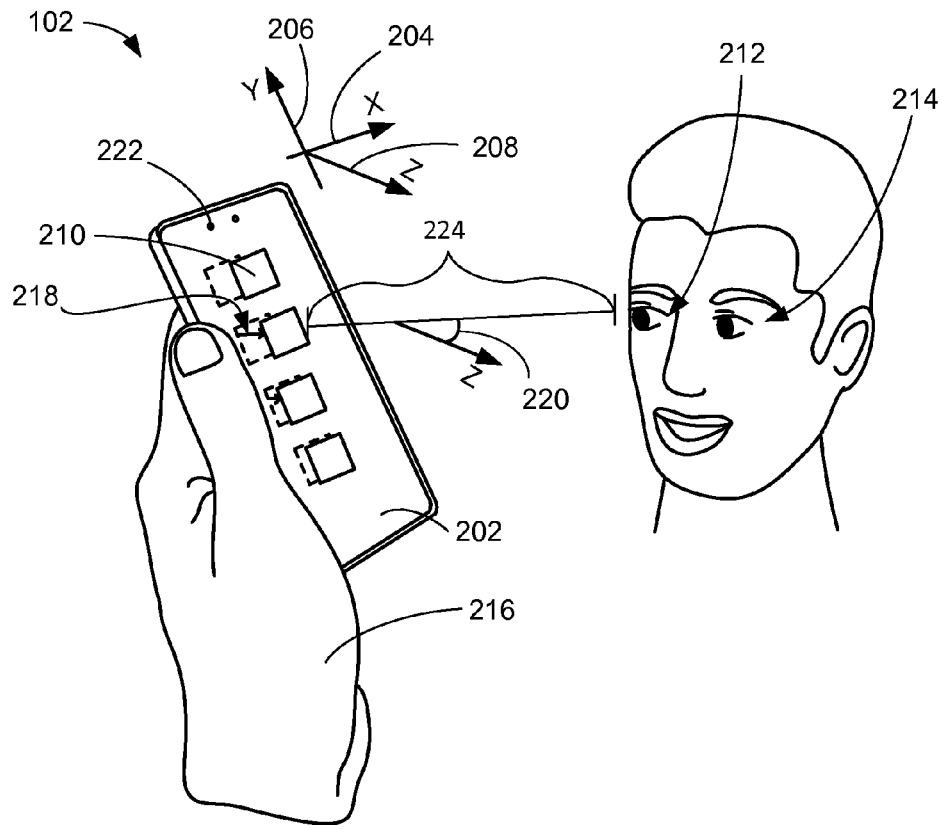
FIG. 2 is an isometric view of the first device of FIG. 1 in an observation depiction.

Referring now to FIG. 2, therein is shown an isometric view of the first device 102 of FIG. 1 in an observation depiction. The first device 102 can be shown having a display 202. The display 202 can be flat or planar having an X-axis 204 and a Y-axis 206. The X-axis 204 and the Y-axis 206 can correspond to the display 202 surface.

A Z-axis 208 is defined as perpendicular from both the X-axis 204 and the Y-axis 206. The Z-axis 208 can extend from the display 202 above or below the display 202. The display 202 can depict objects 210 including visible representations of applications, folders, icons, widgets, windows, command buttons, animated imagery, notifications, contacts, photos, music albums, text, home or auxiliary screens, menus, or a combination thereof. The objects 210 are defined as display entities. For illustrative purposes, FIG. 2 depicts the X-axis 204 and the Y-axis 206 are depicted with the first device 102 in portrait mode, whereby the X-axis 204 along the shorter of the side of the first device 102 and the Y-axis 206 along the longer side of the first device 102. It is understood that the X-axis 204 and the Y-axis 206 can be oriented differently to a different side of the first device 102.

For example, if the first device 102 rotated 90 degrees on the plane having the X-axis 204 and the Y-axis 206, the X-axis 204 would be along the longer side of the first device 102 and the Y-axis 206 would be along the shorter side of the first device 102 and the first device 102 can be viewed in a landscape mode.

The objects 210 can be offset along the Z-axis 208 to give the impression that the objects 210 are floating above the display 202. The objects 210 can be offset from the display 202 in the Z-axis 208 by a number of methods and technologies. For example, the objects 210 can be offset in the Z-axis 208 by fast frame switching, providing binocular disparity between a right eye 212 and a left eye 214 of a user 216. Fast frame switching can provide a separate image to the right eye 212 and the left eye 214 to create the illusion of the objects 210 hovering above the display 202.

The objects 210 can be placed at different points along the Z-axis 208 and away from the display 202 as a visual indication or visualization of height determining factors 218. The objects 210 can also be rotated about the X-axis 204 and the Y-axis 206 based on a viewing angle 220 of the user 216. The viewing angle 220 can be defined as the divergence from the Z-axis 208.

The first device 102 can further include a proximity sensor 222 such as an infrared sensor, an audio or acoustic sensor, or a front facing camera. The first device 102 can utilize the proximity sensor 222 to adjust the position of the objects 210 along the Z-axis 208 as well as the flatness of the objects 210 along the X-axis 204 and the Y-axis 206 described below.

The proximity sensor 222 can detect a user's distance 224. The user's distance 224 is the average distance between the display 202 and the right eye 212 and the left eye 214 of the user 216. The first device 102 can change where the objects 210 are placed along the Z-axis 208 based on the user's distance 224. As an example, the first device 102 can place the objects 210 close to the display 202 when the user's distance 224 is small and further from the display 202 when the user's distance 224 increases. As a further example, the first device 102 can place the objects 210 further from the display 202 when the user's distance 224 is small and close to the display 202 when the user's distance 224 increases.

Figure 3:
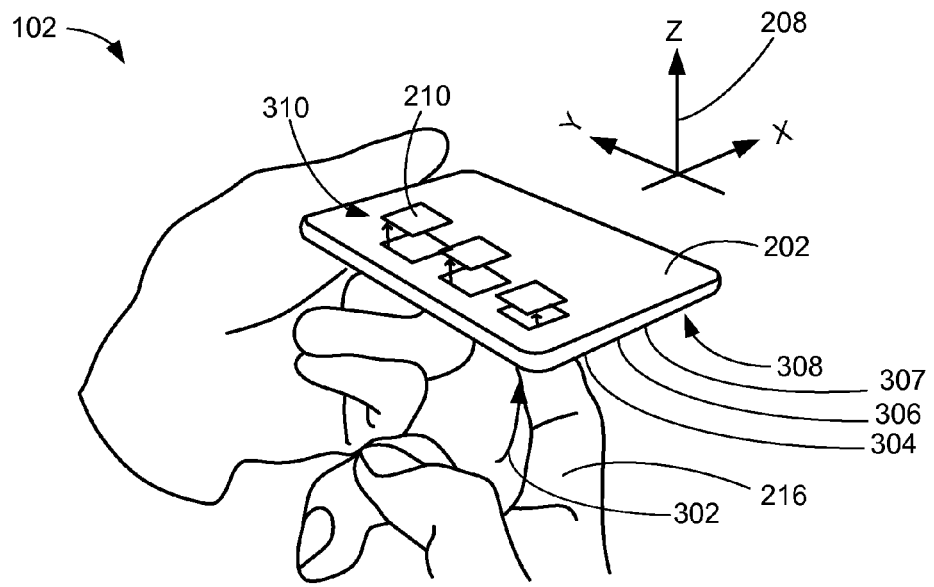
FIG. 3 is an isometric view of the first device of FIG. 1 in a backside tap operation.

Referring now to FIG. 3, therein is shown an isometric view of the first device 102 of FIG. 1 in a backside tap operation. The first device 102 is shown having the objects 210 hovering above the display 202 positioned along the Z-axis 208. The display 202 can be activated to position the objects 210 above the display 202 along the Z-axis 208 by a backside tap 302 by the user 216 of FIG. 2 on a depressible switch 304, an acoustic sensor 306, a capacitive sensor 307, or a combination thereof on a backside 308 of the first device 102 opposite the display 202.

The backside tap 302 can trigger the objects 210 to leap off the display 202 simulating inertia imparted to the objects 210 from the backside tap 302. If conditions, described in detail below, are met the objects 210 will stick to elevated positions 310 along the Z-axis 208 signifying a transition of the display 202 from a two dimensional to a three dimensional interface. If these conditions are not met the objects 210 will appear to fall as if relative gravity were pulling them back onto the display 202.

Figure 4:
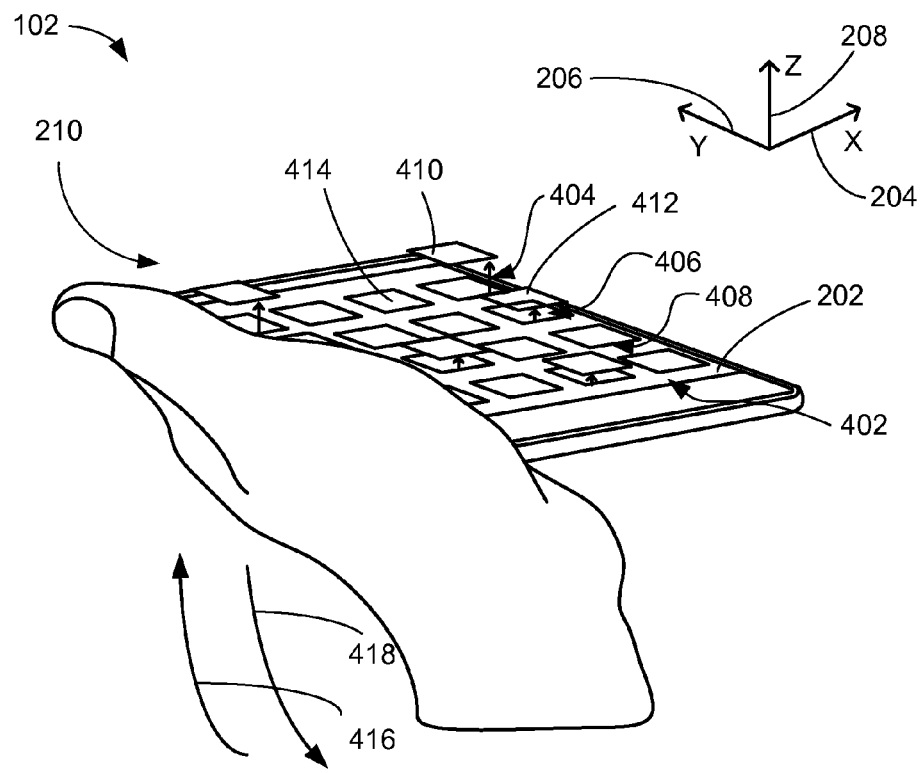
FIG. 4 is an isometric view of the first device of FIG. 1 depicting different heights.

Referring now to FIG. 4, therein is shown an isometric view of the first device 102 of FIG. 1 depicting different heights. The first device 102 is shown in greater detail including relative heights 402 measured along the Z-axis 208 from the surface of the display 202. The relative heights 402 can include a first height 404, a second height 406, and a third height 408. The first height 404 can be further from the display 202 along the Z-axis 208 than the second height 406, while the second height 406 can be further from the display 202 along the Z-axis 208 than the third height 408.

The objects 210 can have the relative heights 402 at different points along the Z-axis 208 and away from the display 202 as a visual indication or visualization of the height determining factors 218 of FIG. 2. As an illustrative example a first object 410 can be placed at the first height 404 further from the display 202 along the Z-axis 208 than a second object 412. The second object 412 can be positioned at the second height 406. Further, a third object 414 can have the third height 408 and appear to be resting on, in, or behind the display 202.

The display 202 can be activated to position the objects 210 above the display 202 along the Z-axis 208 with an upward swing 416 by the user 216 of FIG. 2. The upward swing 416 can trigger the objects 210 to leap off the display 202. If conditions, described in detail below, are met the objects 210 will stick to the relative heights 402 along the Z-axis 208 signifying a transition of the display 202 from a two-dimensional to a three dimensional interface. The upward swing 416 is accomplished by raising or swinging the first device 102 in the direction of the display 202.

If these conditions are not met, the objects 210 will appear to fall as if relative gravity were pulling them back onto the display 202. The objects 210 can also appear to fall as if relative gravity were pulling them back onto the display 202 when a downward swing 418 is applied to the first device 102 allowing the first device 102 to be operated in a two-dimensional mode. The downward swing 418 is accomplished by dropping or swinging the first device 102 away from the direction of the display 202.

Figure 5:
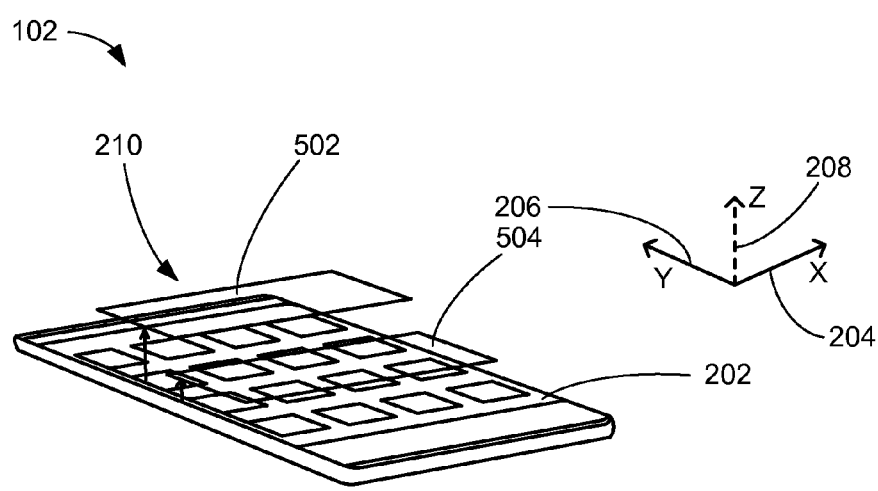
FIG. 5 is an isometric view of the first device of FIG. 1 depicting a notification.

Referring now to FIG. 5, therein is shown an isometric view of the first device 102 of FIG. 1 depicting a notification. The first device 102 is shown in greater detail including the relative heights of the objects 210 over the display 202 along the Z-axis 208. As an illustrative example an urgent notification 502 can be placed further from the display 202 along the Z-axis 208 than a non-urgent reminder 504. Also, when the urgent notification 502 is raised above the display 202 the other objects 210 can be displaced along the X-axis 204 or Y-axis 206 peripheral to the urgent notification 502 or can be moved back to the level of the display 202 along the Z-axis 208 or back to two-dimensional display mode.

As a further example, the urgent notification 502 can be accentuated further from the non-urgent reminder 504 by changing the display between the two. For example, the non-urgent reminder 504 can be obscured or blurred or be depicted as more translucent making it more difficult to read or view while making the urgent notification 502 easier to read by standing out more as the more readable or viewable notification.

Figure 6:
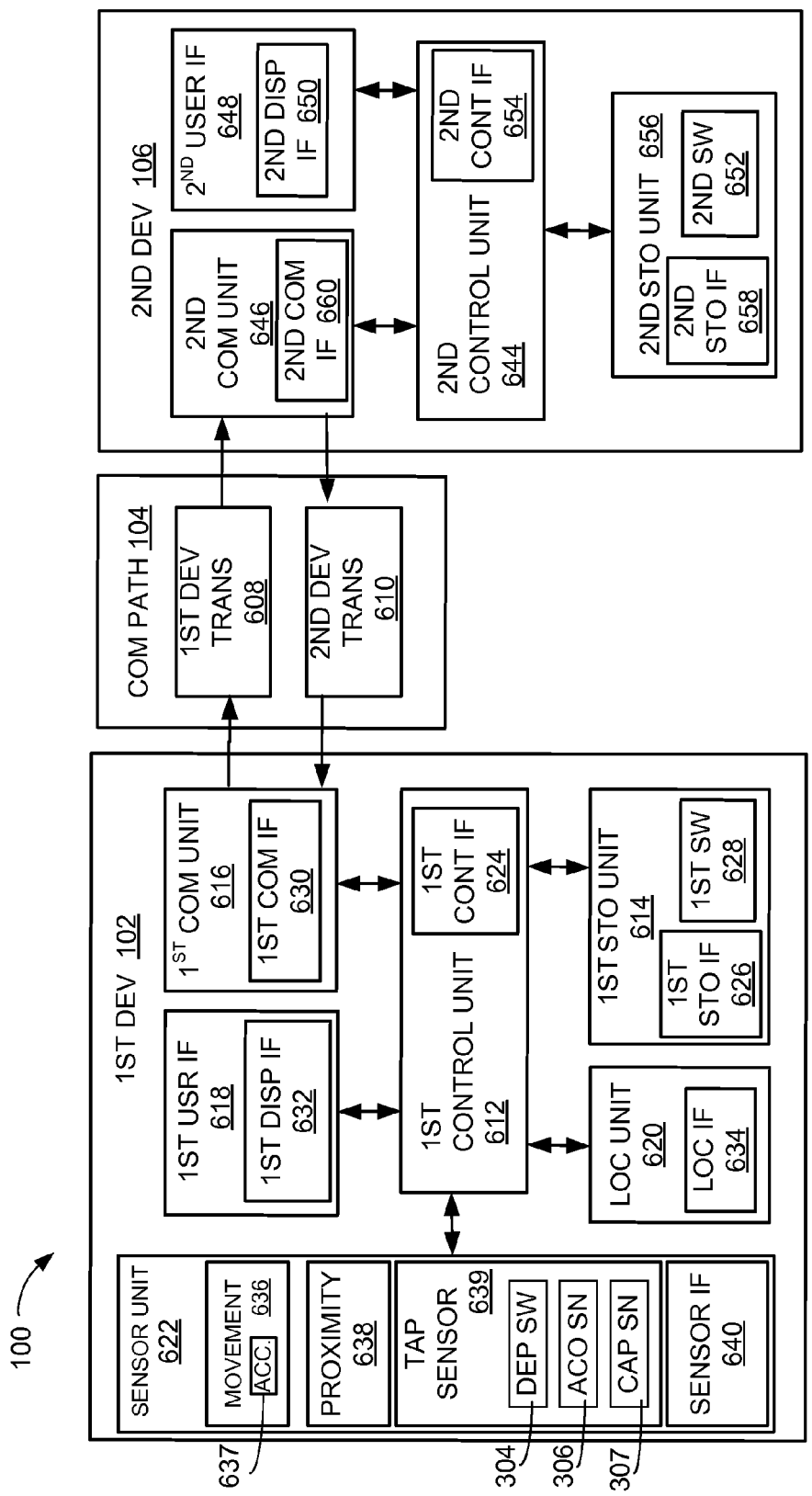
FIG. 6 is an exemplary block diagram of the electronic system.

Referring now to FIG. 6, therein is shown an exemplary block diagram of the electronic system 100. The electronic system 100 can include the first device 102, the communication path 104, and the second device 106. The first device 102 can send information in a first device transmission 608 over the communication path 104 to the second device 106. The second device 106 can send information in a second device transmission 610 over the communication path 104 to the first device 102.

For illustrative purposes, the electronic system 100 is shown with the first device 102 as a client device, although it is understood that the electronic system 100 can have the first device 102 as a different type of device. For example, the first device 102 can be a server.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the embodiment of the present invention.

The first device 102 can include a first control unit 612, a first storage unit 614, a first communication unit 616, a first user interface 618, a location unit 620 and a sensor unit 622. The first control unit 612 can include a first control interface 624. The first control unit 612 can execute a first software 628 to provide the intelligence of the electronic system 100. The first control unit 612 can be implemented in a number of different manners. For example, the first control unit 612 can be a processor, an embedded processor, a microprocessor, a hardware control logic, a hardware finite state machine (FSM), a digital signal processor (DSP), or a combination thereof. The first control interface 624 can be used for communication between the first control unit 612 and other functional units in the first device 102. The first control interface 624 can also be used for communication that is external to the first device 102.

The first control interface 624 can receive information from the other functional units or from external sources, or can transmit information to the other functional units or to external destinations. The external sources and the external destinations refer to sources and destinations physically separate from the first device 102.

The first control interface 624 can be implemented in different ways and can include different implementations depending on which functional units or external units are being interfaced with the first control interface 624. For example, the first control interface 624 can be implemented with a pressure sensor, an inertial sensor, a microelectromechanical system (MEMS), optical circuitry, waveguides, wireless circuitry, wireline circuitry, or a combination thereof.

The location unit 620 can generate location information, current heading, and current speed of the first device 102, as examples. The location unit 620 can be implemented in many ways. For example, the location unit 620 can function as at least a part of a global positioning system (GPS), an inertial navigation system, a cellular-tower location system, a pressure location system, or any combination thereof.

The location unit 620 can include a location interface 634. The location interface 634 can be used for communication between the location unit 620 and other functional units in the first device 102. The location interface 634 can also be used for communication that is external to the first device 102.

The location interface 634 can receive information from the other functional units or from external sources, or can transmit information to the other functional units or to external destinations. The external sources and the external destinations refer to sources and destinations physically separate from the first device 102.

The location interface 634 can include different implementations depending on which functional units or external units are being interfaced with the location unit 620. The location interface 634 can be implemented with technologies and techniques similar to the implementation of the first control interface 624.

The sensor unit 622 can generate information about the environment of the first device 102. The sensor unit 622 can include a movement sensor 636. The movement sensor 636 can generate movement information about torsion, acceleration, vibrations, as examples. The movement sensor 636 can include gyroscopes, accelerometers 637, or a combination thereof.

The sensor unit 622 can also include a proximity sensor 638. The proximity sensor 638 can generate proximity information about distance of users (not shown) or other physical objects (not shown) around the first device 102. The proximity sensor 638 can include ultrasonic sensors, infrared sensors, or a combination thereof.

The sensor unit 622 can also include a tap sensor 639. The tap sensor 639 can generate contact information from the backside 308 of FIG. 3 of the first device 102. The tap sensor 639 can include the depressible switch 304, the acoustic sensor 306, or the capacitive sensor 307.

The sensor unit 622 can include a sensor interface 640. The sensor interface 640 can be used for communication between the sensor unit 622 and other functional units in the first device 102. The sensor interface 640 can also be used for communication that is external to the first device 102.

The sensor interface 640 can receive information from the other functional units or from external sources, or can transmit information to the other functional units or to external destinations. The external sources and the external destinations refer to sources and destinations physically separate from the first device 102.

The sensor interface 640 can include different implementations depending on which functional units or external units are being interfaced with the sensor unit 622. The sensor interface 640 can be implemented with technologies and techniques similar to the implementation of the first control interface 624.

The first storage unit 614 can store the first software 628. The first storage unit 614 can also store the relevant information, such as advertisements, points of interest (POI), navigation routing entries, pushed information, the height determining factors 218 of FIG. 2, information from the depressible switch 304, information from the acoustic sensor 306, information from the capacitive sensor 307, or any combination thereof.

The first storage unit 614 can be a volatile memory, a nonvolatile memory, an internal memory, an external memory, or a combination thereof. For example, the first storage unit 614 can be a nonvolatile storage such as non-volatile random access memory (NVRAM), Flash memory, disk storage, or a volatile storage such as static random access memory (SRAM).

The first storage unit 614 can include a first storage interface 626. The first storage interface 626 can be used for communication between the location unit 620 and other functional units in the first device 102. The first storage interface 626 can also be used for communication that is external to the first device 102.

The first storage interface 626 can receive information from the other functional units or from external sources, or can transmit information to the other functional units or to external destinations. The external sources and the external destinations refer to sources and destinations physically separate from the first device 102.

The first storage interface 626 can include different implementations depending on which functional units or external units are being interfaced with the first storage unit 614. The first storage interface 626 can be implemented with technologies and techniques similar to the implementation of the first control interface 624.

The first communication unit 616 can enable external communication to and from the first device 102. For example, the first communication unit 616 can permit the first device 102 to communicate with the second device 106, an attachment, such as a peripheral device or a computer desktop, and the communication path 104.

The first communication unit 616 can also function as a communication hub allowing the first device 102 to function as part of the communication path 104 and not limited to be an end point or terminal unit to the communication path 104. The first communication unit 616 can include active and passive components, such as microelectronics or an antenna, for interaction with the communication path 104.

The first communication unit 616 can include a first communication interface 630. The first communication interface 630 can be used for communication between the first communication unit 616 and other functional units in the first device 102. The first communication interface 630 can receive information from the other functional units or can transmit information to the other functional units.

The first communication interface 630 can include different implementations depending on which functional units are being interfaced with the first communication unit 616. The first communication interface 630 can be implemented with technologies and techniques similar to the implementation of the first control interface 624.

The first user interface 618 allows a user (not shown) to interface and interact with the first device 102. The first user interface 618 can include an input device and an output device. Examples of the input device of the first user interface 618 can include a keypad, a touchpad, soft-keys, a depressible or touch sensitive backside switch, a keyboard, a microphone, or any combination thereof to provide data and communication inputs.

The first user interface 618 can include a first display interface 632. The first display interface 632 can include a display, a projector, a video screen, a speaker, or any combination thereof.

The first control unit 612 can operate the first display interface 632 to display information generated by the electronic system 100. The first control unit 612 can also execute the first software 628 for the other functions of the electronic system 100, including receiving location information from the location unit 620. The first control unit 612 can further execute the first software 628 for interaction with the communication path 104 via the first communication unit 616.

The second device 106 can be optimized for implementing the embodiment of the present invention in a multiple device embodiment with the first device 102. The second device 106 can provide the additional or higher performance processing power compared to the first device 102. The second device 106 can include a second control unit 644, a second communication unit 646, and a second user interface 648.

The second user interface 648 allows a user (not shown) to interface and interact with the second device 106. The second user interface 648 can include an input device and an output device. Examples of the input device of the second user interface 648 can include a keypad, a touchpad, soft-keys, a keyboard, a microphone, or any combination thereof to provide data and communication inputs. Examples of the output device of the second user interface 648 can include a second display interface 650. The second display interface 650 can include a display, a projector, a video screen, a speaker, or any combination thereof.

The second control unit 644 can execute a second software 652 to provide the intelligence of the second device 106 of the electronic system 100. The second software 652 can operate in conjunction with the first software 628. The second control unit 644 can provide additional performance compared to the first control unit 612.

The second control unit 644 can operate the second user interface 648 to display information. The second control unit 644 can also execute the second software 652 for the other functions of the electronic system 100, including operating the second communication unit 646 to communicate with the first device 102 over the communication path 104.

The second control unit 644 can be implemented in a number of different manners. For example, the second control unit 644 can be a processor, an embedded processor, a microprocessor, a hardware control logic, a hardware finite state machine (FSM), a digital signal processor (DSP), or a combination thereof.

The second control unit 644 can include a second control interface 654. The second control interface 654 can be used for communication between the second control unit 644 and other functional units in the second device 106. The second control interface 654 can also be used for communication that is external to the second device 106.

The second control interface 654 can receive information from the other functional units or from external sources, or can transmit information to the other functional units or to external destinations. The external sources and the external destinations refer to sources and destinations physically separate from the second device 106.

The second control interface 654 can be implemented in different ways and can include different implementations depending on which functional units or external units are being interfaced with the second control interface 654. For example, the second control interface 654 can be implemented with a pressure sensor, an inertial sensor, a microelectromechanical system (MEMS), optical circuitry, waveguides, wireless circuitry, wireline circuitry, or a combination thereof.

A second storage unit 656 can store the second software 652. The second storage unit 656 can also store the relevant information, such as advertisements, points of interest (POI), navigation routing entries, pushed information, the height determining factors 218 of FIG. 2, information from the depressible switch 304, information from the acoustic sensor 306, information from the capacitive sensor 307, or any combination thereof. The second storage unit 656 can be sized to provide the additional storage capacity to supplement the first storage unit 614.

For illustrative purposes, the second storage unit 656 is shown as a single element, although it is understood that the second storage unit 656 can be a distribution of storage elements. Also for illustrative purposes, the electronic system 100 is shown with the second storage unit 656 as a single hierarchy storage system, although it is understood that the electronic system 100 can have the second storage unit 656 in a different configuration. For example, the second storage unit 656 can be formed with different storage technologies forming a memory hierarchal system including different levels of caching, main memory, rotating media, or off-line storage.

The second storage unit 656 can be a volatile memory, a nonvolatile memory, an internal memory, an external memory, or a combination thereof. For example, the second storage unit 656 can be a nonvolatile storage such as non-volatile random access memory (NVRAM), Flash memory, disk storage, or a volatile storage such as static random access memory (SRAM).

The second storage unit 656 can include a second storage interface 658. The second storage interface 658 can be used for communication between the location unit 620 and other functional units in the second device 106. The second storage interface 658 can also be used for communication that is external to the second device 106.

The second storage interface 658 can receive information from the other functional units or from external sources, or can transmit information to the other functional units or to external destinations. The external sources and the external destinations refer to sources and destinations physically separate from the second device 106.

The second storage interface 658 can include different implementations depending on which functional units or external units are being interfaced with the second storage unit 656. The second storage interface 658 can be implemented with technologies and techniques similar to the implementation of the second control interface 654.

The second communication unit 646 can enable external communication to and from the second device 106. For example, the second communication unit 646 can permit the second device 106 to communicate with the first device 102 over the communication path 104.

The second communication unit 646 can also function as a communication hub allowing the second device 106 to function as part of the communication path 104 and not limited to be an end point or terminal unit to the communication path 104. The second communication unit 646 can include active and passive components, such as microelectronics or an antenna, for interaction with the communication path 104.

The second communication unit 646 can include a second communication interface 660. The second communication interface 660 can be used for communication between the second communication unit 646 and other functional units in the second device 106. The second communication interface 660 can receive information from the other functional units or can transmit information to the other functional units.

The second communication interface 660 can include different implementations depending on which functional units are being interfaced with the second communication unit 646. The second communication interface 660 can be implemented with technologies and techniques similar to the implementation of the second control interface 654.

The first communication unit 616 can couple with the communication path 104 to send information to the second device 106 in the first device transmission 608. The second device 106 can receive information in the second communication unit 646 from the first device transmission 608 of the communication path 104.

The second communication unit 646 can couple with the communication path 104 to send information to the first device 102 in the second device transmission 610. The first device 102 can receive information in the first communication unit 616 from the second device transmission 610 of the communication path 104. The electronic system 100 can be executed by the first control unit 612, the second control unit 644, or a combination thereof.

For illustrative purposes, the second device 106 is shown with the partition having the second user interface 648, the second storage unit 656, the second control unit 644, and the second communication unit 646, although it is understood that the second device 106 can have a different partition. For example, the second software 652 can be partitioned differently such that some or all of its function can be in the second control unit 644 and the second communication unit 646. Also, the second device 106 can include other functional units not shown in FIG. 6 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100. For example, the first device 102 is described to operate the location unit 620, although it is understood that the second device 106 can also operate the location unit 620.

Figure 7:
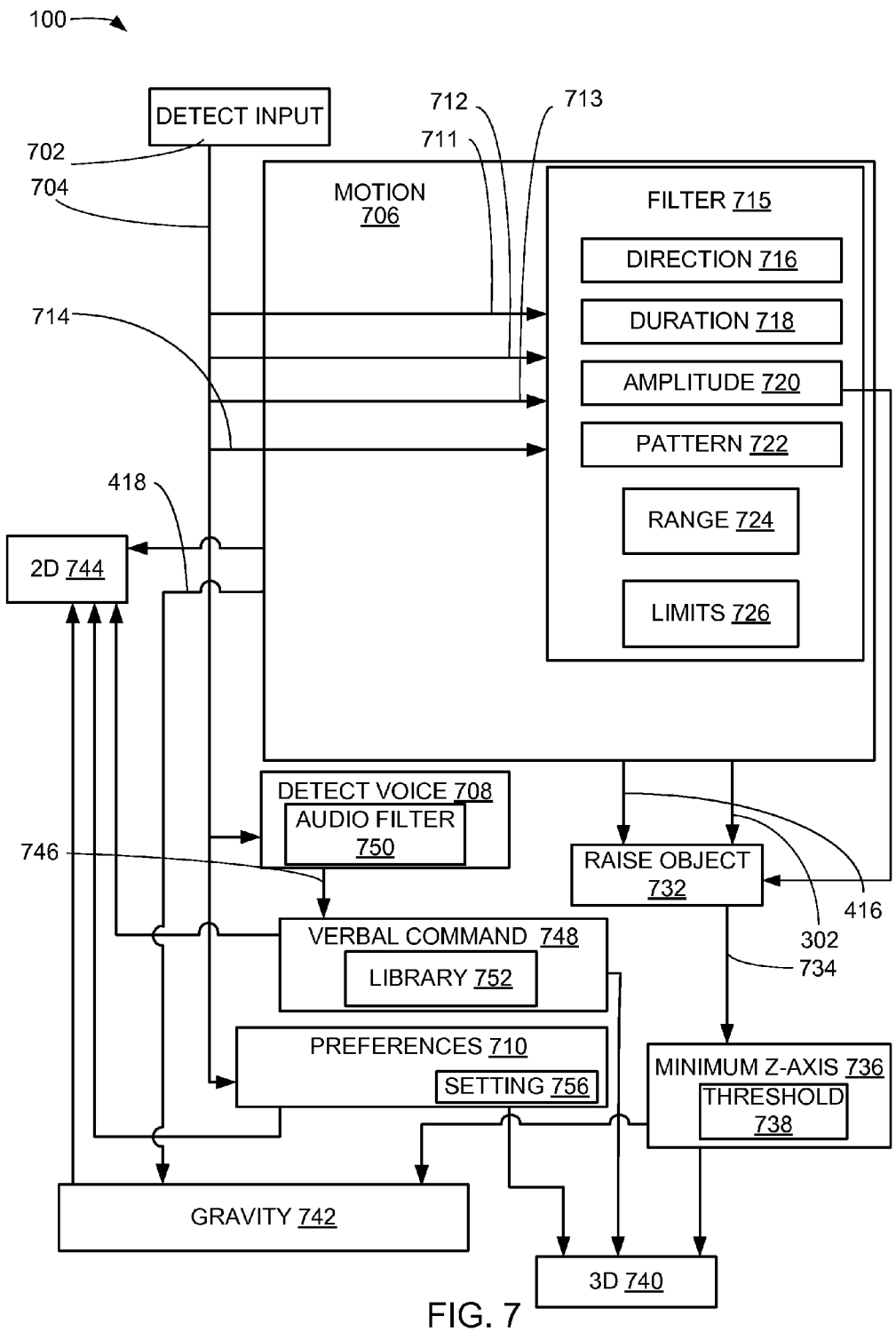
FIG. 7 is a control flow of the electronic system for three-dimensional activation.

Referring now to FIG. 7, therein is shown a control flow of the electronic system 100 for three-dimensional activation. The electronic system 100 can include a detect input module 702 that can detect information from software and hardware local to the first device 102 of FIG. 1 or external to the first device 102. The detect input module 702 can output triggering information 704 to a motion module 706, a detect voice module 708, and a preferences module 710.

The triggering information 704 can include an acceleration portion 711 from the accelerometers 637 of FIG. 6, a depression portion 712 from the depressible switch 304 of FIG. 3, an acoustic portion 713 from the acoustic sensor 306 of FIG. 3, a capacitive portion 714 from the capacitive sensors 307 of FIG. 3. The triggering information 704 can further include audio for input to the detect voice module and system information for input into the preferences module 710. The acceleration portion 711, the depression portion 712, the capacitive portion 714, and the acoustic portion 713 can be input into an input filter module 715.

The input filter module 715 can analyze the triggering information 704 based on a number of factors. The input filter module 715 can utilize a direction 716, a duration 718, and an amplitude 720 to analyze the triggering information 704.

The direction 716 can include the acceleration portion 711 along the X-axis 204 of FIG. 2, Y-axis 206 of FIG. 2, Z-axis 208 of FIG. 2, or a combination thereof. Further the direction 716 can include the acceleration portion 711 spinning around the X-axis 204, the Y-axis 206, the Z-axis 208, or a combination thereof. The direction 716 can also include the acoustic portion 713 offset from the acoustic sensor 306 along the X-axis 204 or the Y-axis 206 on the backside 308 of FIG. 3 of the first device 102.

The duration 718 can include the length of time the acceleration portion 711, the depression portion 712, or the acoustic portion 713 is exerted on the first device 102. The amplitude 720 can be the amount of force of the acceleration portion 711, the distance the depressible switch 304 moves from the depression portion 712, or the strength in decibels of the acoustic portion 713.

The input filter module 715 can detect patterns 722 of the acceleration portion 711, the depression portion 712, or the acoustic portion 713. The patterns 722 can include the direction 716, the duration 718, and the amplitude 720.

When the patterns 722 match the direction 716, the duration 718, and the amplitude 720 of known profiles, the input filter module 715 can exclude the patterns 722 not indicative of the backside tap 302 from further analysis. For example, when the first device 102 is being vibrated, the patterns 722 can be recognized and the triggering information 704 associated with the vibration can be eliminated from further analysis. As another example, the patterns 722 can be recognized as a single tap, multiple tap, single finger tap, multiple finger tap, or a combination thereof.

The input filter module 715 can filter the triggering information 704 by implementing ranges 724 with limits 726 for the amplitude 720, the direction 716, or the duration 718. The input filter module 715 can filter out the triggering information 704 when the duration 718 is too short or too long to be indicative of the backside tap 302. When the duration 718 is too short and falls below the limits 726 or is too long and falls above the limits 726 the triggering information 704 falls outside the limits 726 and can be eliminated from consideration.

As an example, when the acceleration portion 711 is from an accelerating aircraft, the duration 718 of the acceleration portion 711 can be sustained over multiple seconds or possibly minutes and would not indicate the backside tap 302 and can be eliminated. Similarly when the depression portion 712 is from resting on a book, the depression portion 712 can be sustained for multiple minutes and not indicative of the backside tap 302 and can be eliminated.

The input filter module 715 can filter out the triggering information 704 when the direction 716 is not from the backside 308 toward the display 202 of FIG. 2 along the Z-axis 208. As an example, when the acceleration portion 711 is from the first device 102 being dropped on a corner, the acceleration portion 711 is not along the Z-axis 208 and is not indicative of the backside tap 302 and can be eliminated. Also, when the acoustic portion 713 is detected too far offset from the acoustic sensor 306 the acoustic portion 713 can be assumed to be detected on a different surface of the first device 102 than the backside 308 and not indicative of the backside tap 302 and can be eliminated.

The input filter module 715 can filter out the triggering information 704 when the amplitude 720 is too light to be indicative of the backside tap 302. When the amplitude 720 is too light the triggering information 704 can be eliminated as not indicative of a backside tap 302.

As an example, when the acceleration portion 711, the depression portion 712, or the acoustic portion 713 is generated by the first device 102 brushing against a key ring in the pocket of the user 216 of FIG. 2, the amplitude 720 can be below the limits 726. The amplitude 720 will be too light to indicate the backside tap 302 and can be eliminated.

The motion module 706 can utilize a combination of the acceleration portion 711, the depression portion 712, and the acoustic portion 713 of the triggering information 704 to determine the backside tap 302. When the acceleration portion 711, the depression portion 712, the acoustic portion 713, or a combination indicates the first device 102 has been tapped on the backside 308 the motion module 706 can output the backside tap 302.

The motion module 706 can further record the acceleration portion 711 to be filtered with the input filter module 715 and determine the upward swing 416 and downward swing 418. The direction 716 of the acceleration portion 711 and the amplitude 720 of the acceleration portion 711 can be detected and when the acceleration portion 711 falls within the range 726 it will be recognized and output as the upward swing 416 or the downward swing 418. The backside tap 302 and the upward swing 416 can be input into a raise objects module 732. The raise objects module 732 raises the objects 210 of FIG. 2 currently present on the display 202 of FIG. 2. The raise objects module 732 generates a depiction of the objects 210 along the Z-axis 208 above the display 202 proportional to the amplitude 720 detected by the first device 102. The raise objects module 732 incorporates the amplitude 720 to determine an activation height 734 along the Z-axis 208 that the objects 210 should be depicted. As an illustrative example, the objects 210 can be depicted along the Z-axis 208 linearly or exponentially proportional to the amplitude 720.

The raise objects module 732 can generate a depiction the objects 210 accelerating along the Z-axis 208 proportionally to the amplitude 720 as if inertia were imparted to the objects 210. The raise objects module 732 can also generate a depiction of the objects 210 slowing near the activation height 734 as if gravity were acting on the objects 210, slowing the objects 210 near the activation height 734.

The raise objects module 732 can be coupled to a minimum Z-axis module 736 and can output the activation height 734 to the minimum Z-axis module 736. The minimum Z-axis module 736 can includes an activation height threshold 738. The minimum Z-axis module 736 can determine whether the activation height 734 of the objects 210 along the Z-axis 208 is greater than the activation height threshold 738.

When the minimum Z-axis module 736 determines that the activation height 734 is greater than the activation height threshold 738, a three dimensional module 740 is invoked. When the activation height 734 is equal or below the activation height threshold 738 the minimum Z-axis module 736 will not invoke the three dimensional module 740 but will instead will invoke a gravity module 742.

The three dimensional module 740 can be coupled to the minimum Z-axis module 736 and maintains a depiction of the objects 210 above the display 202 along the Z-axis 208. When the objects 210 are maintained above the display 202 of the first device 102, the user 216 perceives a three dimensional visualization of the objects 210.

The minimum Z-axis module 736 can also be coupled to the gravity module 742. When the gravity module 742 is invoked by the minimum Z-axis module 736, the gravity module 742 can simulate the objects 210 falling back to the screen from the activation height 734 along the Z-axis 208. The effect of the objects 210 falling back to the display 202 simulates an inertia of the objects 210 that enhances the interaction with the first device 102. The gravity module 742 can also be coupled directly to the motion module 706 and input the downward swing 418 to simulate the gravity on the objects 210 returning to a two dimensional state when the downward swing 418 is detected.

The gravity module 742 can simulate the objects 210 returning to a two dimensional state and can be coupled to a two dimensional module 744. The two dimensional module 744 can be a setting of the display 202 operating in a two dimensional mode. The two dimensional module 744 can operate with the objects 210 at a zero point along the Z-axis 208 saving computational resources and power.

It has been discovered that implementing the motion module 706 and the gravity module 742, with the triggering information 704 and the results from the input filter module 715, provide an enhanced experience for the user 216 and allow increased utilization of the objects 210 by increasing the density of information about the objects 210 that can be displayed on the display 202.

Further, it has been discovered that incorporating the amplitude 720 with the backside tap 302 and the upward swing 416 to determine the activation height 734 of the objects 210 and to evaluate the activation height 734 within the minimum Z-axis module 736 against the activation height threshold 738 improves the accuracy of the three dimensional module 740.

The triggering information 704 can be input into the detect voice module 708. The detect voice module 708 can isolate a voice input 746 from the triggering information 704 and input the voice input 746 into a verbal command module 748. As an example, the detect voice module 708 can include an audio filter 750 to detect the voice input 746. The audio filter 750 can include voice recognition such as a band pass filter or SIRI™.

The voice input 746 can be an input to the verbal command module 748. The verbal command module 748 can include a library 752 of verbal commands that will activate the three dimensional module 740. The voice input 746 can be compared with the library 752 and when the voice input 746 is recognized or matches a known voice command the three dimensional module 740 can be invoked. When the voice input 746 does not match a known voice command the two dimensional module 744 can be invoked.

The detect input module 702 can be further coupled to the preferences module 710. The triggering information 704 can be input into the preferences module 710. The preferences module 710 includes a setting 756 that can invoke either the two dimensional module 744 or the three dimensional module 740. When the triggering information 704 triggers the setting 756 that indicates the display 202 should be operated in a three dimensional mode, the preferences module 710 will invoke the three dimensional module 740. When the triggering information 704 invokes the setting 756 that indicates the display 202 should be operated in a two dimensional mode, such as a double tap, a tap again to toggle, or a low battery, the preferences module 710 will invoke the two dimensional module 744.

The two dimensional module 744 and the three dimensional module 740 both include inputs from the verbal command module 748, the minimum Z-axis module 736, and the preferences module 710. The priority of the inputs from the verbal command module 748, the minimum Z-axis module 736, and the preferences module 710 is preset and the two dimensional module 744 and the three dimensional module 740 can be coupled together to activate only a two dimensional mode or a three dimensional mode at any given time.

The two dimensional module 744 and the three dimensional module 740 can be implemented on the first control unit 612 of FIG. 6 of the first device 102. The verbal command module 748, the minimum Z-axis module 736, and the preferences module 710 can be coupled to the two dimensional module 744 and the three dimensional module 740 implemented on the first control unit 612 by communicating with the first control interface 624 of FIG. 6. The two dimensional module 744 and the three dimensional module 740 can be coupled to the display 202 of the first device 102 through the first control interface 624 in communication with the first display interface 632 of FIG. 6 of the first user interface 618 of FIG. 6. The display 202 can be contained within the first user interface 618.

The detect input module 702 can be contained within the first control unit 612 and can include inputs from the first control interface 624 coupled to the first user interface 618, the location unit 620 of FIG. 6, the first storage unit 614 of FIG. 6, the sensor unit 622 of FIG. 6, or can include input from the second device 106 of FIG. 1 through the communication path 104 of FIG. 1. The detect input module 702 can output the triggering information 704 internally to the first control unit 612 to the motion module 706, the detect voice module 708, or the preferences module 710.

The motion module 706, the detect voice module 708, or the preferences module 710 can all operate within the first control unit 612 but can also operate on the second device 106 through the communication path 104 and input into the first control unit 612 through the first control interface 624. The motion module 706 can analyze the acceleration portion 711 of the triggering information 704 from the movement sensor 636 of FIG. 6 of the sensor unit 622. The triggering information 704 from the movement sensor 636 can be input to the motion module 706 by coupling the sensor interface 640 of FIG. 6 with the first control interface 624.

The detect voice module 708 can collect the triggering information 704 from the first user interface 618. The verbal command module 748 coupled to the detect voice module 708 can be operated on the first control unit 612 or the second control unit 644 of FIG. 6 of the second device 106 and transmitted through the communication path 104.

The minimum Z-axis module 736 and the gravity module 742 coupled to the motion module 706 can be operated on the first control unit 612 of the first device 102 or the second control unit 644 of the second device 106. The activation height threshold 738 of the minimum Z-axis module 736 can be contained in the first storage unit 614 and accessed through the first storage interface 626 of FIG. 6.

The motion module 706 can be implemented on the first control unit 612 of the first device 102 or the second control unit 644 of the second device 106. The motion module 706 can include inputs of the acceleration portion 711 collected from the movement sensor 636 of the sensor unit 622 and also from various sensors contained in the first user interface 618 such as audio inputs, depressible switch inputs, capacitive inputs, or other similar interface sensors of the first user interface 618.

The raise objects module 732 coupled to the motion module 706 can be implemented on the first control unit 612 of the first device 102 or the second control unit 644 of the second device 106. The input filter module 715 can be operated on the first control unit 612 of the first device 102 or the second control unit 644 of the second device 106. The input filter module 715 can store the ranges 724 and the limits 726 in the first storage unit 614, which can be retrieved through the first storage interface 626.

The direction 716, the duration 718, and the amplitude 720 of the input filter module 715 can all be elements of the acceleration portion 711 generated in the movement sensor 636 of the sensor unit 622. The patterns 722 can operate on the first control unit 612 utilizing the first storage interface 626 of FIG. 6 and coupled to the first control unit 612 through the first storage interface 626. The patterns 722 can also operate on the second control unit 644 of the second device 106.

The modules discussed above and below can be implemented in hardware. For example the modules can be implemented as hardware acceleration implementations in the first control unit 612, the second control unit 644, or a combination thereof. The modules can also be implemented as hardware implementations in the first device 102, the second device 106, or a combination thereof outside of the first control unit 612 or the second control unit 644.

Figure 8:
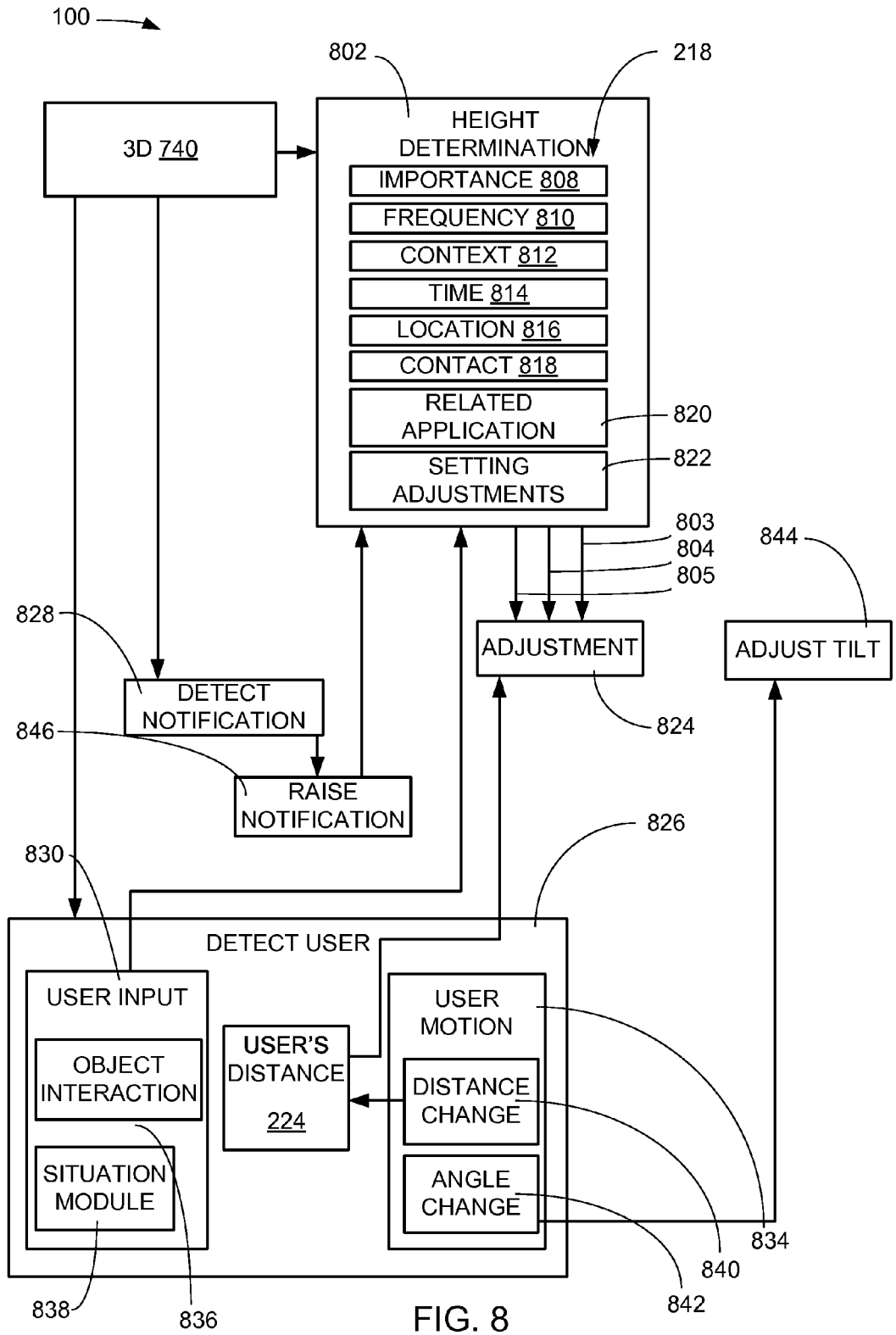
FIG. 8 is a control flow of the electronic system for dynamic height adjustment.

Referring now to FIG. 8, therein is shown a control flow of the electronic system 100 for dynamic height adjustment. The electronic system 100 can include the three dimensional module 740. The three dimensional module 740 can be coupled to the minimum Z-axis module 736 of FIG. 7 and maintains a depiction of the objects 210 of FIG. 2 above the display 202 of FIG. 2 along the Z-axis 208 of FIG. 2. When the objects 210 are depicted above the display 202 of the first device 102 of FIG. 1, the user 216 of FIG. 2 perceives a three dimensional visualization of the objects 210.

A height determination module 802 can be coupled to the three dimensional module 740. The height determination module 802 can evaluate each of the objects 210 on the display 202 individually against the height determining factors 218. As an example, the height determination module 802 can calculate a first adjustment value 803 for the first object 410 of FIG. 4, a second adjustment value 804 for the second object 412 of FIG. 4, and a third adjustment value 805 for the third object 414 of FIG. 4.

The first adjustment value 803, the second adjustment value 804, and the third adjustment value 805 can be used to determine the first height 404 of FIG. 4 of the first object 410, the second height 406 of FIG. 4 of the second object 412, and the third height 408 of FIG. 4 of the third object 414. The first height 404, the second height 406, and the third height 408 can be determined individually utilizing the height determining factors 218.

The height determining factors 218 can include an importance 808, a frequency 810, a context 812, a time 814, a location 816, a contact 818, a related application 820, and setting adjustments 822. When the objects 210 are depicted at the activation height 734 of FIG. 7, the height determination module 802 can output the first adjustment value 803, the second adjustment value 804, and the third adjustment value 805 as an offset from the activation height 734 to an adjustment module 824. When the first object 410, the second object 412, and the third object 414 are not at the activation height 734, the height determination module 802 can output the first adjustment value 803, the second adjustment value 804, and the third adjustment value 805 as an offset from the first height 404, the second height 406, and the third height 408, respectively.

The height determination module 802 can evaluate the objects 210 based on the importance 808. The importance 808 can be flagged within the objects 210 by the user 216 of FIG. 2 or flagged by another source. The importance 808 can be urgent or low-priority indications. For example, when the first object 410 is marked as urgent, the height determination module 802 can assign the first adjustment value 803 to adjust the first height 404 above the second height 406 of the second object 412 that is not marked urgent or that is marked low-priority.

The importance 808 can also be program related. For example, when the first object 410 is a calendar with a heavy schedule on a certain day, the height determination module 802 can assign the first adjustment value 803 to adjust the first height 404 above the second height 406 of the second object 412 that indicates a computer game rarely played. The height determination module 802 can assign the first adjustment value 803 to the first height 404 because the importance 808 of the calendar is greater than the importance 808 of a game since the calendar shows a heavy schedule.

The height determination module 802 can evaluate the objects 210 based on the frequency 810. The frequency 810 can be based on use by the user 216. For example, when the first object 410 or the second object 412 are more frequently used than the third object 414, the height determination module 802 can assign the first adjustment value 803 to the first object 410 and the second adjustment value 804 to the second object 412 to adjust the first height 404 and the second height 406 above the third height 408 of the third object 414. The frequency 810 can be based on the use by the user 216 when the two dimensional module 744 of FIG. 7 or the three dimensional module 740 are utilized.

The height determination module 802 can evaluate the objects 210 based on the context 812. The context 812 can be based on a recently used search term, a verbal command, terms the user 216 is using in a discussion near the first device 102, or a combination. The context 812 can also be based a social graph of the user 216, input patterns of the user 216, the intention of the user 216, a relevant action of the user 216, the situation of the user 216.

For example, when the first object 410 is a visual representation of a currently used search term on the first device 102, the height determination module 802 can assign the first adjustment value 803 to adjust the first height 404 above the second height 406 of the second object 412 that does not represent a currently used search term. As another example, when the user 216 is having a discussion detectible by the first device 102 about a picture represented by the second object 412, the height determination module 802 can assign the second adjustment value 804 to adjust the second object 412 above the third height 408 of the third object 414 that does not represent the subject being discussed by the user 216.

The height determination module 802 can evaluate the objects 210 based on the time 814. The time 814 can be based on the hour of day, day of week, week of month, month of year, a season of year, or a special event.

For example, when the first object 410 represents a program routinely used during a range of hours every day, like a news report, the height determination module 802 can assign the first adjustment value 803 to adjust the first height 404 above the second height 406 of the second object 412 that is not routinely utilized during the current range of time. As another example, when the time 814 is before a friend's wedding and the first object 410 represents a shopping application, the height determination module 802 can assign the first adjustment value 803 to adjust the first height 404 above the second height 406 or the third height 408 that do not pertain to preparing for the upcoming wedding.

The height determination module 802 can evaluate the objects 210 based on the location 816. The location 816 can be based on where the first device 102 is or is heading. The height determination module 802 can assign the first adjustment value 803 to adjust the first height 404 higher along the Z-axis 208 than the second height 406 of the second object 412 when the first object 410 represents a physical object within a specified radial distance from the first device 102 and the second object 412 does not.

For example, if the location 816 is a sports stadium and the first object 410 represents information about athletes playing at the location 816 the height determination module 802 can assign the first adjustment value 803 to adjust the first height 404 above the second height 406 of the second object 412 that do not relate to the location 816. As another example, when the first object 410 represents an eatery within a preset five mile radius, the height determination module 802 can assign the first adjustment value 803 to adjust the first height 404 further along the Z-axis 208 than the second height 406 of the second object 412 that represents an eatery five miles or more away from the first device 102. As a further example, when the first object 410 represents a contact, the height determination module 802 can assign the first adjustment value 803 to adjust the first height 404 further along the Z-axis 208 than the second height 406 of the second object 412 that represents a more distant contact.

The height determination module 802 can evaluate the objects 210 based on the contact 818. The contact 818 can be based on a current communication or can be based on a group classification of the contact 818.

For example, when the first object 410 represents the contact information for a person currently being communicated to through the first device 102, the height determination module 802 can assign the first adjustment value 803 to adjust the first height 404 further along the Z-axis 208 than the second height 406 of the second object 412 that represents the contact information for a person that is not currently being contacted through the first device 102. As a further example, when the first object 410 and the second object 412 represent family members of the user 216 the height determination module 802 can assign the first adjustment value 803 and the second adjustment value 804 to adjust the first height 404 and the second height 406 above the third height 408 of the third object 414 that does not represent a family member.

The height determination module 802 can evaluate the objects 210 based on the related application 820. The related application 820 can be software related to a currently used software, software related to a function the user 216 is performing, or software power consumption.

For example, when the first object 410 can input directly into an application currently running on the first device 102, the height determination module 802 can assign the first adjustment value 803 to adjust the first height 404 further along the Z-axis 208 than the second height 406 of the second object 412 that cannot input directly into an application currently running on the first device 102. A specific example can include the first object 410 that correlates to a "what is here" icon on a currently running map application, the first object 410 will be assigned the first adjustment value 803 that provides the first height 404 higher than the second height 406 of the second object 412 that correlates to a "web search" icon to open up a new application on the first device 102 but does not input directly into the currently running map application.

The height determination module 802 can evaluate the objects 210 based on the setting adjustments 822. The setting adjustments 822 can be based on the preferences of the user 216 or the settings of the first device 102.

For example, when the first object 410 represents a clock that the user 216 has decided works best at the first height 404 the height determination module 802 can provide the first adjustment value 803 to maintain the first height 404 relative to the second height 406 and the third height 408. As another example, when the first object 410 represents an audio control being used, the height determination module 802 can assign the first adjustment value 803 to adjust the first height 404 further along the Z-axis 208 than the second height 406 of the second object 412 that does not represent an audio adjustment.

The height determination module 802 can also evaluate the objects 210 based on the importance 808, the frequency 810, the context 812, the time 814, the location 816, the contact 818, the related application 820, and the setting adjustments 822 together or in a partial combination of the height determining factors 218. The adjustment module 824 can incorporate the first adjustment value 803, the second adjustment value 804, and the third adjustment value 805 to adjust the first height 404, the second height 406, and the third height 408 in absolute terms or in relative terms.

When the first adjustment value 803, the second adjustment value 804, or the third adjustment value 805 places the first object 410, the second object 412, or the third object 414 above the Z-axis 208 capabilities of the display 202, the adjustment module 824 can adjust the objects 210 to maintain the relative heights 402 of FIG. 4 of the objects 210 based on the first adjustment value 803, the second adjustment value 804, or the third adjustment value 805. When the first adjustment value 803, the second adjustment value 804, or the third adjustment value 805 do not place the objects 210 above the Z-axis 208 capabilities of the display 202, the adjustment module 824 can adjust the objects 210 in absolute terms.

For example, when the first object 410 represents a regularly utilized application at the current time of day the height determination module 802 can assign the first adjustment value 803 to produce an appropriate first height 404. When the second object 412 represents a telephone call received by the first device 102, the height determination module 802 may determine that the second object 412 should be raised above the first object 410 and assign the second adjustment value 804 to the second height 406 of the second object 412 above the first height 404. The adjustment module 824 can determine whether the second object 412 would be placed above the Z-axis 208 capabilities of the first device 102. If the second object 412 would be placed above the Z-axis 208 capabilities of the first device 102, the adjustment module 824 will decrease the first height 404 of the first object 410 and increase the second height 406 of the second object 412 above the first height 404 but below the Z-axis 208 capabilities of the first device 102.

The three dimensional module 740 can be coupled to a detect user module 826 and to a detect notification module 828. The detect user module 826 can detect a user input 830, the user's distance 224, or user motion 834.

When the detect user module 826 detects the user input 830 on the first device 102 an object interaction module 836 and a situation module 838 can communicate with the height determination module 802 to re-evaluate the relative heights 402 of the objects 210 on the display 202. The object interaction module 836 can monitor the user input 830 for any interaction with the objects 210 that are displayed above the display 202 along the Z-axis 208. If the object interaction module 836 detects that the objects 210 are being interacted with, the object interaction module 836 can communicate with the height determination module 802.

The height determination module 802 can evaluate the objects 210 that the object interaction module 836 has flagged similarly to the evaluations of the objects 210 in the height determination module 802 described above. Once the height determination module 802 re-evaluates the objects 210 that the object interaction module 836 has detected interaction with, the adjustment module 824 can change the relative heights 402 for the objects 210 along the Z-axis 208.

The situation module 838 can monitor the first device 102 for the user input 830 that might change the context 812 of the first device 102. If the situation module 838 detects that the context 812 of the first device 102 has changed the situation module 838 will communicate with the height determination module 802 and re-evaluate all of the objects 210 displayed on the display 202 of the first device 102. The situation module 838 detects a change in the context 812 when a new window is opened, a new application is opened, a new term or location displayed, when a user setting is changed. The situation module 838 also detects a change when the first device 102 changes the location 816, the time 814, or the contact 818.

When the situation module 838 detects a change the height determination module 802 will re-evaluate all of the objects 210 shown on the display 202 in a way similar to the evaluation of the objects 210 described above. Once the height determination module 802 re-evaluates the objects 210 the adjustment module 824 can adjust the relative heights 402 of the objects 210 on the display 202.

The detect user module 826 can also detect the user's distance 224. The detect user module 826 can be coupled directly to the adjustment module 824 for adjustment to the relative heights 402 of the objects 210 when the user's distance 224 is detected. When the user's distance 224 is detected, the adjustment module 824 can adjust the relative heights 402 of the objects 210 commensurate with the user's distance 224. The relative heights 402 of the objects 210 can be adjusted linearly within a range of the user's distance 224 or can be adjusted based on a distance adjustment table (not shown).

It has been discovered that coupling the three dimensional module 740 to the height determination module 802 utilizing the height determining factors 218 provide greatly increased information density about the objects 210 to enable greater and more efficient use of the display 202 and the objects 210 on the display 202. Further, it has been discovered that coupling the user input 830 detected in the detect user module 826, including the object interaction module 836 and the situation module 838, greatly improve the accuracy of the relative heights 402 of the objects 210 when the objects 210 are re-evaluated in the height determination module 802 in light of the user input 830.

The detect user module 826 can also detect the user motion 834. The user motion 834 can be evaluated in a distance change module 840 and in an angle change module 842. When the detect user module 826 detects the user motion 834 in the distance change module 840 the user's distance 224 can be re-measured. The adjustment module 824 coupled to the detect user module 826 then adjusts the relative heights 402 of the objects 210 from the display 202 in the way described above.

The detect user module 826 can also detect the user motion 834 in the angle change module 842. The angle change module 842 determines whether the viewing angle 220 of FIG. 2 of the user 216 has changed with respect to the X-axis 204 of FIG. 2, Y-axis 206 of FIG. 2, and Z-axis 208. An adjust tilt module 844 can be coupled to the angle change module 842. When the angle change module 842 detects a change in the viewing angle of the user 216 the adjust tilt module 844 can change the tilt of the objects 210 displayed above the display 202 in three dimensional mode. The adjust tilt module 844 can tilt the objects 210 by rotating the objects 210 about the X-axis 204, the Y-axis 206, or both to follow the user motion 834.

The detect notification module 828 coupled to the three dimensional module 740 can monitor the first device 102 for any notifications that arising for the first device 102. The detect notification module 828 can be coupled to a raise notifications module 846. When the detect notification module 828 detects a notification the raise notifications module 846 will raise the notification as one of the objects 210 along the Z-axis 208.

The raise notifications module 846 can raise the first object 410 as the urgent notification 502 of FIG. 5 and displace the second object 412 and the third object 414 peripheral to the first object 410. The raise notifications module 846 can also raise the first object 410 as the urgent notification 502 and lower the second object 412 and the third object 414 along the Z-axis 208 to the display 202. In this example, as the raise notification module 846 can also accentuate the first object 410 as it raises the first object 410. This can be done by the raise notification module 846 changing the view of the first object 410 relative to the second object 412, the third object 414, or a combination thereof. This change can be done by making the second object 412, the third object 414, or a combination thereof appear to be less in focus or blurred or obscured compared to the first object 410.

The raise notifications module 846 can be coupled to the height determination module 802 to determine the first adjustment value 803, second adjustment value 804, or third adjustment value 805 to produce the relative heights 402 of notifications that are recently pushed as the objects 210 on the display 202. The height determination module 802 evaluates the notifications as the objects 210. The adjustment module 824 can adjust the relative heights 402 of the notifications.

The raise notification module 846 can also change the view of the first object 410 relative to the second object 412, the third object 414, or a combination thereof based on the relative heights 402. For example, the change or blurring effect can be applied to the lower objects if the relative heights 402 between the first object 410 is sufficiently different from that of the second object 412, the third object 414, or a combination thereof. The relative heights 402 can be sufficiently different if the relative heights 402 equals or is greater than a height differential threshold.

The three dimensional module 740 can be implemented on the first control unit 612 of FIG. 6 of the first device 102. The height determination module 802 can operate within the first control unit 612 of the first device 102 or the second control unit 644 of FIG. 6 of the second device 106 of FIG. 1. The three dimensional module 740 can be coupled to the height determination module 802 module internally within the first control unit 612 or through the first communication unit 616 of FIG. 6 and the communication path 104 of FIG. 1.

The height determining factors 218 can be evaluated against the objects 210 of the first device 102 on the first device 102 in the first control unit 612 or on the second device 106 coupled to the first device 102 over the communication path. The detect user module 826 can be operated on the first device 102 within the first control unit 612 and can gather the user input 830, the user's distance 224, and the user motion 834 from the first user interface 618 of FIG. 6, the sensor unit 622 of FIG. 6, the movement sensor 636 of FIG. 6, or the location unit 620 of FIG. 6. The detect user module 826 can also gather the user input 830, the user's distance 224, and the user motion 834 from a combination of the sensor unit 622, the first user interface 618, or the location unit 620.

The output of the detect user module 826 can be coupled to the adjustment module 824 running on the first control unit 612 through the sensor interface 640 of FIG. 6, the first display interface 632 of FIG. 6, or the location interface 634 of FIG. 6 and funneled through the first control interface 624 of FIG. 6 on the first control unit 612. Both the adjustment module 824 and the adjust tilt module 844 can be implemented on the first device 102 and operate within the first control unit 612. The detect notification module 828 and the raise notification module 846 can be operated on the first control unit 612 of the first device 102 or the second control unit 644 of the second device 106.

Figure 9:
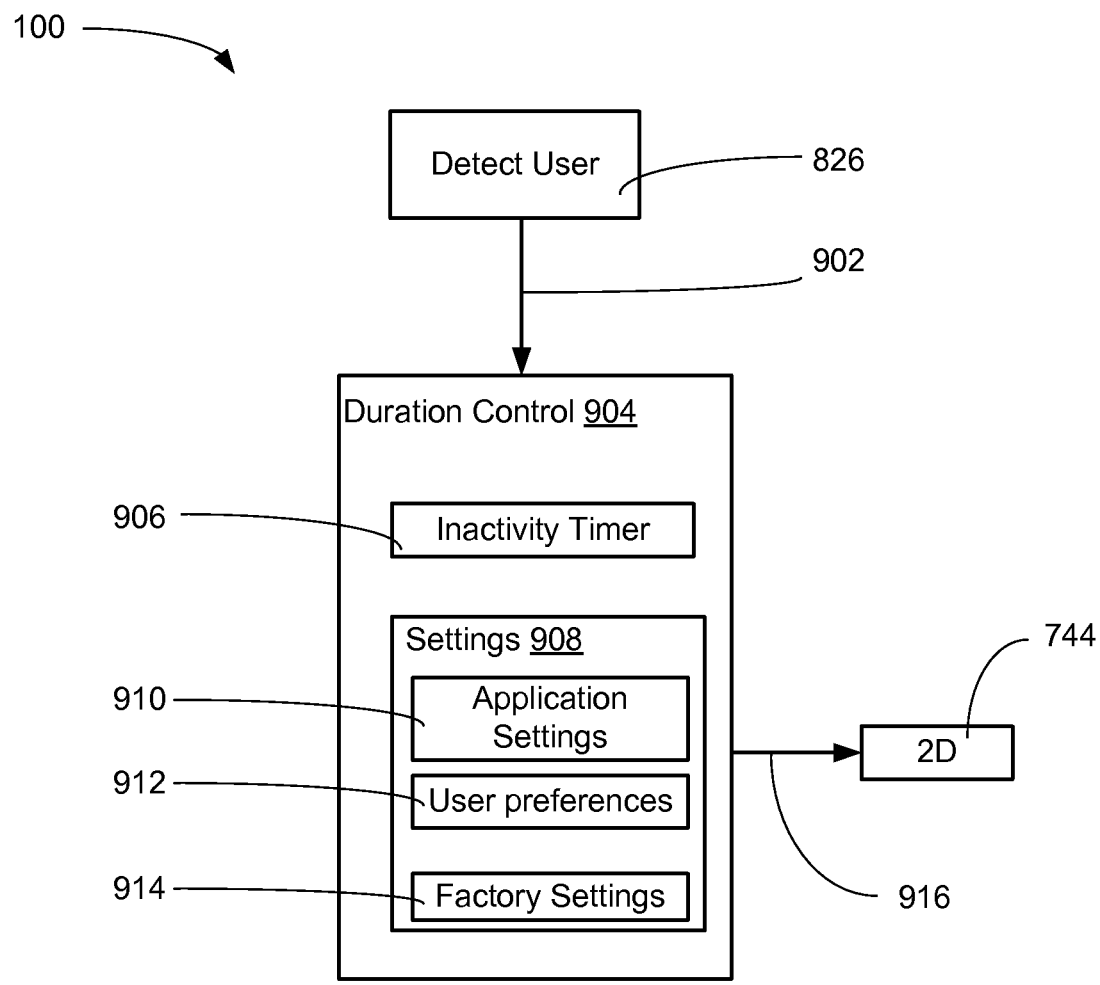
FIG. 9 is a control flow of the electronic system for duration limitation.

Referring now to FIG. 9, therein is shown a control flow of the electronic system 100 for duration limitation. The electronic system 100 is shown having the detect user module 826. The detect user module 826 can determine whether the user 216 of FIG. 2 is in the vicinity or interacting with the first device 102 of FIG. 1. When the detect user module 826 does not detect the user 216 the detect user module 826 will output a non-detection signal 902 to a duration control module 904.

The duration control module 904 can be coupled to the detect user module 826 to receive the non-detection signal 902. The duration control module 904 can include an inactivity timer 906. The inactivity timer 906 can be triggered when the non-detection signal 902 is received by the duration control module 904 and count how long the detect user module 826 outputs the non-detection signal 902. The duration control module 904 can compare the results from the inactivity timer 906 with duration control settings 908.

The duration control settings 908 can include application settings 910, user preferences 912, and factory settings 914. When the duration control module 904 indicates that the output of the inactivity timer 906 exceeds one of the duration control settings 908 then the duration control module 904 can output an exceed setting indication 916 and invoke the two dimensional module 744.

The detect user module 826 can be implemented on the first device 102 or the second device 106 of FIG. 1. The detect user module 826 can incorporate inputs from the sensor unit 622 of FIG. 6, the first user interface 618 of FIG. 6, the location unit 620 of FIG. 6, or inputs from the second device 106 through the first communication unit 616 of FIG. 6.

The duration control module 904 can be implemented on the first control unit 612 of FIG. 6 of the first device 102. When implemented on the first device 102, the duration control module 904 can be run on the first control unit 612, and the duration control settings 908 can be stored in the first storage unit 614 of FIG. 6. The inactivity timer 906 of the duration control module 904 can be implemented on the first control unit 612.

Physical transformation of changing position between the user and the objects 210 of FIG. 2 occurs when the user 216 interacts with the objects 210. The first device 102 can change the relative heights 402 of FIG. 4 that the objects 210 are positioned along the Z-axis 208 of FIG. 2, according to the height determining factors 218 of FIG. 2. As the interaction of the user 216 with the objects 210 in the physical world occurs, the interaction itself creates additional information captured by the first device 102 and incorporated into the Z-axis 208 representation of the objects 210 modifying the interaction of the user 216 and the objects 210 on the display 202 of FIG. 2.

Figure 10:
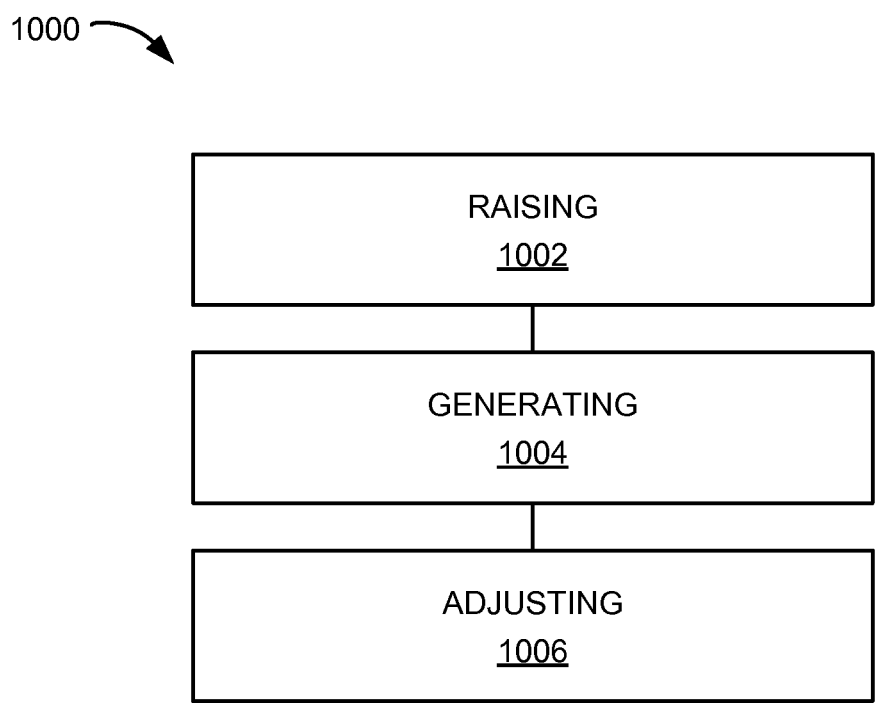
FIG. 10 is a flow chart of a method of operation of the electronic system of FIG. 1 in a further embodiment of the present invention.

Referring now to FIG. 10, therein is shown a flow chart of a method 1000 of operation of the electronic system 100 of FIG. 1 in a further embodiment of the present invention. The method 1000 includes: raising an object along a Z-axis for displaying the object above a display in a block 1002; generating an adjustment value based on a height determining factor including frequency in a block 1004; and adjusting the object along the Z-axis based on the adjustment value in a block 1006.

Further for examples, the adjustment value can be generated based on an importance, a context, a time, a location, a contact, a related application, a setting adjustment, or a combination thereof. The object of the user interface can be raised based on an amplitude of a backside tap or an upward swing. The object can be adjusted based on the user's distance for viewing. The invocation of raising the objects can be filtered based on duration, amplitude, and direction. If the invocation is not above an activation level, the object can fall back into the display and not be raised above the display. An urgent notification can be raised as an object. Raised objects can fall back into the display based on inactivity timer.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. An electronic system comprising:
   a location unit configured to determine a location of a device relative to a first object representing a physical object and a second object representing another physical object; a control unit, coupled to the location unit, configured to:
   recognize an amplitude from a backside tap and an upward swing;
   display the first object and the second object for providing a perception of being located above a display of the device along a Z-axis based on the amplitude;
   generate a first adjustment value based on a height determining factor including the first object within a specified radial distance, representing a preset distance, from the location and the second object outside of the specified radial distance from the location, the first adjustment value for controlling depiction of the first object on the display;
   generate a second adjustment value based on the height determining factor including a frequency and the location of the device; and
   adjust a first height of the first object and a second height of the second object along the Z-axis imparting relative heights to the first object and the second object, and the relative heights based on the first adjustment value and the second adjustment value.

2. The system as claimed in claim 1 wherein the control unit is configured to generate the first adjustment value further based on an importance, a context, a time, a contact, a related application, a setting adjustment, or a combination thereof.

3. The system as claimed in claim 1 wherein the control unit is further configured to:
   recognize the backside tap and the upward swing;
   use the amplitude as a basis in raising the first object along the Z-axis; and
   use a user's distance in adjusting the first object along the Z-axis.

4. The system as claimed in claim 1 wherein the control unit is further configured to:

filter triggering information for a duration, the amplitude, a direction or a combination thereof to raise the first object along the Z-axis; and
use the amplitude as a basis in raising the first object along the Z-axis.

5. The system as claimed in claim 1 wherein the control unit is configured to raise an urgent notification.

6. The system as claimed in claim 1 wherein the control unit is further configured to simulate the first object and the second object falling along the Z-axis when the amplitude is below an activation height threshold.

7. The system as claimed in claim 1 wherein the control unit is further configured to:
receive a non-detection signal to invoke an inactivity timer; and
reduce the first height of the first object and the second height of the second object once a duration control setting has been reached.

8. The system as claimed in claim 1 wherein the control unit is configured to raise the first object and the second object with the depiction of the second object obscured.

9. The system as claimed in claim 1 wherein the control unit is further configured to raise a third object as an urgent notification, and displace the first object and the second object peripheral to the third object.

10. A method of operation of an electronic system comprising:
determining a location for locating a device relative to a first object representing a physical object and a second object representing another physical object;
recognizing an amplitude from a backside tap and an upward swing;
displaying the first object and the second object for providing a perception of being located above a display of a device along a Z-axis based on the amplitude;
generating a first adjustment value, with a control unit, based on a height determining factor including the first object within a specified radial distance, representing a preset distance, from the location and the second object outside of the specified radial distance from the location, the first adjustment value for controlling depiction of the first object on the display;
generating a second adjustment value based on the height determining factor including a frequency and the location; and
adjusting a first height of the first object and a second height of the second object along the Z-axis imparting relative heights to the first object and the second object, and the relative heights based on the first adjustment value and the second adjustment value.

11. The method as claimed in claim 10 wherein generating the adjustment value includes generating the adjustment value further based on an importance, a context, a time, a contact, a related application, a setting adjustment, or a combination thereof.

12. The method as claimed in claim 10 further comprising:
recognizing the backside tap and the upward swing;
raising the first object includes using the amplitude as a basis in raising the first object along the Z-axis; and
adjusting the first object includes using a user's distance in adjusting the first object along the Z-axis.

13. The method as claimed in claim 10 further comprising:
filtering triggering information for a duration, the amplitude, a direction or a combination thereof;
raising the first object includes using the amplitude as a basis in raising the first object along the Z-axis.

14. The method as claimed in claim 10 further comprising raising the first object includes raising an urgent notification.

15. A method of operation of an electronic system comprising:
determining a location for locating a device relative to a first object representing a physical object and a second object representing another physical object;
recognizing an amplitude from a backside tap and an upward swing;
displaying the first object and the second object, with a control unit, to an activation height for displaying the first object and the second object for perception of being located above a display of a device along a Z-axis based on the amplitude;
generating a first adjustment value based on a height determining factor including the first object within a specified radial distance, representing a preset distance, from the location and the second object outside of the specified radial distance from the location, the first adjustment value for controlling depiction of the first object on the display;
generating a second adjustment value based on the height determining factor including a frequency and the location; and
adjusting a first height of the first object and a second height of the second object for displaying the first object further along the Z-axis than the second object for imparting relative heights to the first object and the second object, and the relative heights based on the first adjustment value and the second adjustment value.

16. The method as claimed in claim 15 further comprising simulating the first object and the second object falling along the Z-axis when the amplitude is below an activation height threshold.

17. The method as claimed in claim 15 further comprising:
receiving a non-detection signal to invoke an inactivity timer; and
reducing the first height of the first object and the second height of the second object once a duration control setting has been reached.

18. The method as claimed in claim 15 further comprising raising the first object and the second object includes raising the first object and the second object with the depiction of the second object obscured.

19. The method as claimed in claim 15 further comprising:
raising a third object as an urgent notification; and
displacing the first object and the second object peripheral to the third object.

* * * * *